Dec. 24, 1940.  G. SMITH  2,226,448
MAGNETIC FIELD STRUCTURE
Filed March 1, 1939  2 Sheets-Sheet 1
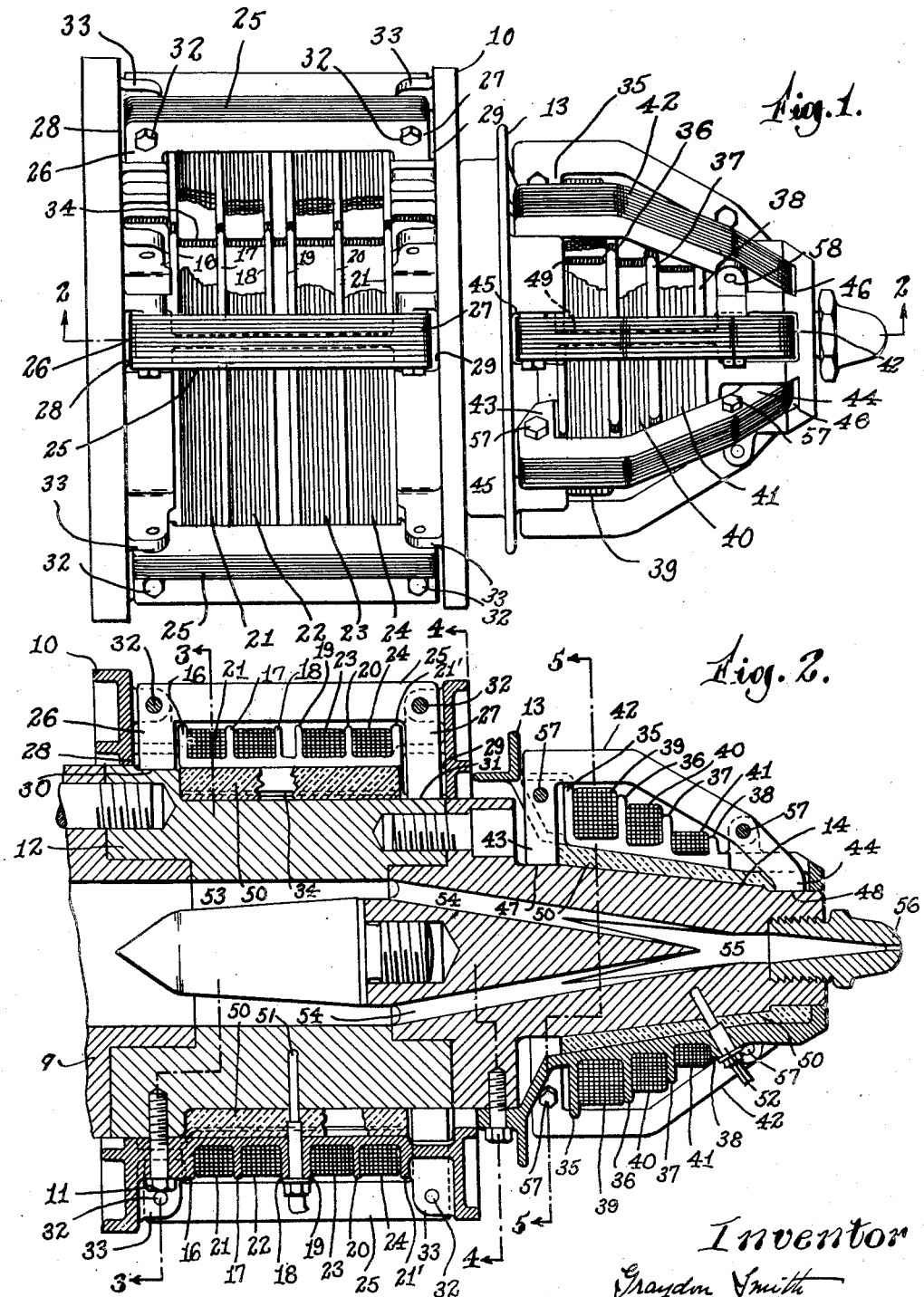
Inventor
Graydon Smith
by Kenway & Witter
Attorneys Dec. 24, 1940.  G. SMITH  2,226,448
MAGNETIC FIELD STRUCTURE
Filed March 1, 1939  2 Sheets-Sheet 2

Inventor
Graydon Smith
by Kenway & Witter
Attorneys

Patented Dec. 24, 1940

2,226,448

UNITED STATES PATENT OFFICE 2,226,448

MAGNETIC FIELD STRUCTURE

Graydon Smith, Cambridge, Mass., assignor to Reed-Prentice Corporation, Worcester, Mass., a corporation of Massachusetts Application March 1, 1939, Serial No. 259,201

5 Claims. (Cl. 219—47)

This invention relates to magnetic field structures and consists in an improved construction for supporting the field coils and core in electromagnetic heaters.

In my co-pending application Serial No. 181,250 filed December 23, 1937, jointly with Albert Allen and entiled "Magnetic heater," there is described a preferred form of heater conduit for heating thermo-plastic material or heat plasticizable material preparatory to molding. In that device a low frequency alternating current is applied to field coils arranged around a ferrous conduit to set up through a varying magnetic field, hysteresis losses in the body of the conduit for providing the desired heat to soften or render plastic the material passing through it.

In such magnetic field coils, the alternation of the current tends to produce vibrations which if not restrained would chafe and break down the wire insulation, in ordinary electrical machinery it is usual to bond the wire coils in varnish which holds the turns rigidly in place, in heaters depending upon magnetic losses, the temperatures developed are so high that varnish, etc., cannot be successfully used.

My invention herein contemplates the use of a rigid spool, preferably of metal, and the winding of the magnetic field coils tightly thereonto to form a self-contained unit in which these objectionable features are eliminated. This unit furthermore embodies a structure forming a magnetic circuit which structure includes laminated steel stacks extending through suitably spaced openings or the like in the spool, the induction of eddy currents in the spool being prevented by suitable slots in the spool which serve to interrupt the conducting path therethrough. The objects of the invention include the production of such a self-contained unit and including a spool for supporting the field coils and magnetic elements in a single rigid unit, and furthermore in so constructing the spool that it can be of metal and substantially free of objectionable induced currents.

These and other features of the invention will be best understood and appreciated from the following description of a preferred embodiment of the invention selected for purposes of illustration and shown in the accompanying drawings in which—

Fig. 1 is a plan view looking downwardly upon one embodiment of an electro-magnetic heater utilizing the features of this invention;

Fig. 2 is a sectional view along the line 2—2 of Fig. 1;

Figure 3:
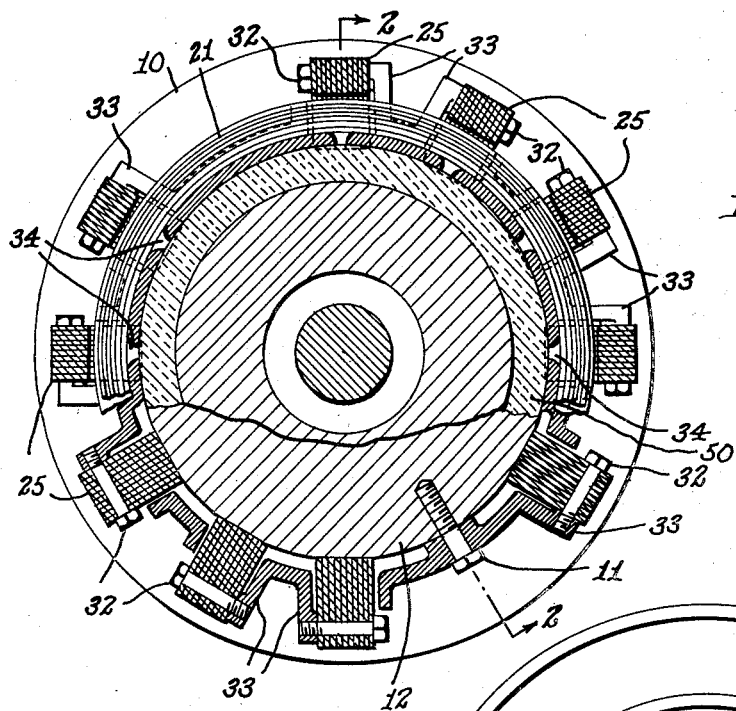
Fig. 3 is a sectional view along the line 3—3 of Fig. 2.

The drawings illustrate a cylindrical conduit 12 having attached to its forward end a converging portion 14 provided with a nozzle 56 at its free outer end. The invention resides in novel heating units cooperating or associated with the portions 12 and 14. Each of these units 12 and 14 is built onto a rigid spool, preferably of metal, and the two units are substantially identical except that one unit built onto a spool 10 is substantially cylindrical and the other unit built onto a spool 13 is somewhat conical in shape, these units being respectively attached to the portions 12 and 14 by tap screws 11 and 15.

The spool 10 has a plurality of circumferential fins or flanges 16—21' inclusive formed thereon and extending therearound and providing circular spaces or troughs therebetween for receiving the field coils. These coils 21—24 inclusive are wound tightly onto the spool within the spaces provided between these flanges, the flanges srving to support the coils against movement, and a plurality of coils provide a greater efficiency than would a single coil.

In the embodiment illustrated, the magnetic circuit for the spool 10 is made up of ten stacks 25 of laminated sheets which, for example, may be silicon steel. Each stack 25 has legs 26 and 27 at its two ends which extend respectively into lateral openings 28 and 29 through the spool adjacent to its ends, the ends of the legs being in contact with the conduit 12 at 30 and 31 when the conduit is located in the longitudinal passage of the spool. The laminated stacks are drilled to receive tap screws 32 for fastening the stacks to lugs 33 integral with the spool.

Forming the spools of metal provides strong and rigid construction, and the induction of voltage in the spool and the consequent production of eddy currents is prevented by providing longitudinal slots 34 in the body of the spool which interrupt the conductive path linking the magnetic circuit, these slots extending through the spool from each opening 28 to its companion opening 29. If the slots 34 were not provided, the spool would act as a short circuited turn and as a result eddy currents would be generated which would be so great as to melt the spool.

The laminated stacks 25 together with the conduit or heater 12 form a closed magnetic circuit and the application of an alternating current to the field coil causes magnetic losses in the conduit which are effective to raise the temperature of and soften the thermoplastic material which is being passed through the conduit.

The construction of the spool 13 and the unit built thereonto is like that of the spool 10 except that the shape of the former is somewhat conical. The spool 13 is provided with a plurality of fins or flanges 35—38 inclusive formed thereon and extending therearound and providing spaces therebetween for receiving the field coils. These coils 39—41 inclusive are wound tightly onto the spool within the spaces provided between these flanges, the flanges serving to support the coils against movement, as in the case of the spool 10.

The magnetic circuit for the spool 10 is made up, in the embodiment illustrated, of eight stacks 42 of laminated sheets which may be of silicon steel. Each stack 42 has inwardly extending legs 43 and 44 at its two ends which extend respectively into openings 45 and 46 through the spool adjacent to its ends, the ends of the legs being in contact with the conduit 14 at 47 and 48 and the stacks 42 together with the conduit 14 forming a closed magnetic circuit. The laminated stacks are drilled to receive tap screws 57 for fastening the stacks to lugs 58 integral with the spool and the spool is slotted longitudinally therethrough at 49 as indicated in Fig. 1.

It will now be apparent that I have provided a superior magnetic field structure for use with a conduit or heater of the nature described, which is more efficient and substantial than like structures heretofore known. This structure embodies a rigid unit including as its basic element a rigid spool on which is supported the field coils and cooperating elements for providing the magnetic circuit. The coils are wound directly onto the spool and the cooperating elements are supported thereon in a manner providing a very compact unit which can be manufactured and assembled with facility and which can be easily and quickly applied to and removed from the conduit. It will furthermore be apparent that the separating of the coils by the fins or flanges results in more effective heat dissipation than would be the case were but one continuous coil wound on each spool.

It is also noted that the two embodiments of the spool herein described are for the purpose of illustration, and that the invention is not limited to this exact apparatus and arrangement since many variations may suggest themselves to those skilled in the art without departure from the essence of the invention. Also, while I prefer to construct the spools of metal provided with the slots 34 and 49 therein, it will be understood that the invention is not necessarily limited thereto and that the use of a non-metallic material would eliminate the necessity for such slots.

Insulating layers 50, which may be of asbestos, are preferably provided between the spools and the conduits for reducing as far as possible the heat upon the coils, and thermo-couples 51 and 52 in the conduits 12 and 14 may be used for indicating the temperatures of the conduits.

Figure 4:
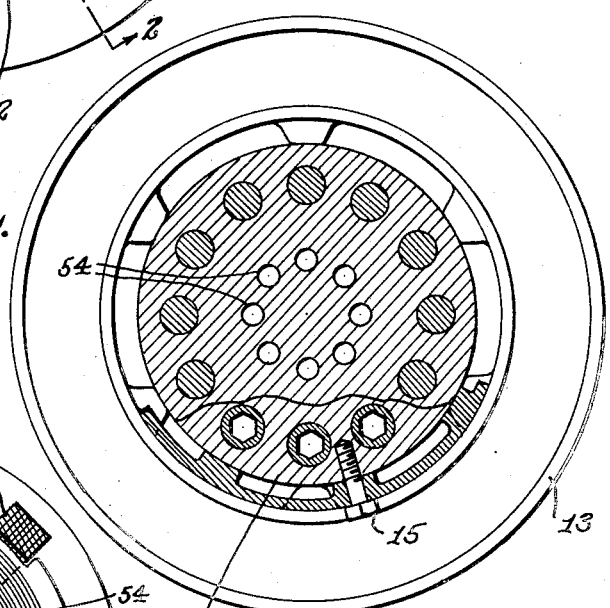
Fig. 4 is a sectional view along the line 4—4 of Fig. 2.
Figure 5:
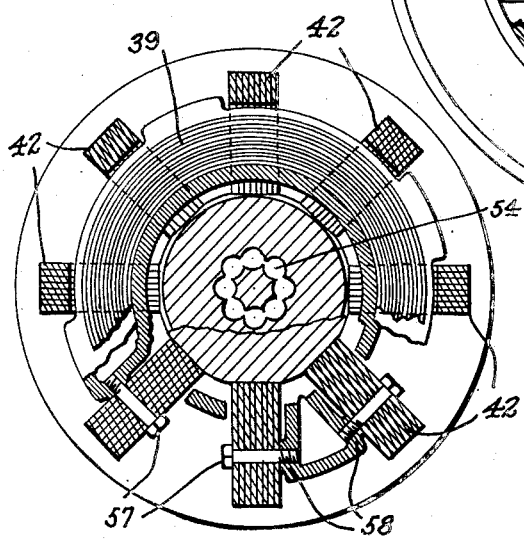
Fig. 5 is a sectional view along the line 5—5 of Fig. 2.

The member 14 is bolted to the member 12 in end to end relation and has a centrally disposed core therein (Figs. 2 and 4) and a longitudinally disposed passage 55 from the core through the forward end of the member. The passage 55 is in communication with the passage 53 through a plurality of passages 54 located about the core, and a second core extending into the passage 53 is supported by a stud carried thereby and threaded into the first named core, all as illustrated in Fig. 2.

The operation of the apparatus is explained in detail in the aforementioned co-pending application. The thermoplastic material to be acted upon is forced under pressure into the channel 53 within the conduit 12 from equipment indicated at 9 and connected to the inner end of the conduit 12. The hysteresis losses in the conduit caused by reversals of flux in the magnetic circuit soften and plastisise the material sufficiently for it to flow smoothly and evenly within the converging portion of the channel within the conduit 14, and while this portion of the channel is indicated in the drawings as comprising a plurality of bores, it may have any suitable passage construction. The heat generated by the magnetic losses in the conduits 12 and 14 is such that when the material has reached the nozzle it has been reduced to such fluidity as to be readily forced through the nozzle and into suitable molding equipment.

Having thus described my invention, what I claim as new and desire to secure by Letters Patent of the United States, is—

1. A magnetic field structure comprising a spool having a central passage and a plurality of relatively spaced circumferential fins providing a plurality of troughs therebetween, a plurality of field coils located respectively in the troughs, means forming a magnetic circuit and including a plurality of laminated stacks attached to the spool and having bridge portions extending over the coils outside the spool and coils and relatively spaced leg portions extending inwardly of the spool to the passage extending centrally therethrough, said passage being adapted to receive a ferrous conduit to be heated.

2. Heating apparatus for heat plasticizable materials in combination with a cylindrical ferro-magnetic body having a passage longitudinally therethrough for such materials, comprising a metallic spool on and surrounding the body and slotted thereacross to interrupt an electric conducting path therearound, a plurality of field coils on and surrounding the spool, fins carried by the spool between and separating the coils, and a plurality of relatively spaced laminated stacks extending over the coils and having legs at the ends thereof extending to and in contact with the body, said stacks forming a magnetic circuit with the body.

3. Heating apparatus in combination with mechanism for injecting thermoplastic materials into a mold and including a ferro-magnetic body having a passage longitudinally therethrough for such materials, a second ferro-magnetic body attached to the first body in end to end relation and having a centrally disposed core therein and a longitudinally disposed passage from the core through the end remote from the first body and in communication with the first-named passage through a plurality of passages located about the core, and a second core carried by the first core and disposed centrally within the first named passage, comprising two spools respectively on and surrounding the bodies, field coils wound on and around the spools, and a plurality of relatively spaced laminated stacks attached to the spools and extending over the coils and having legs at the ends thereof extending to and in contact with the bodies, the stacks forming magnetic circuits with the bodies.

4. A magnetic field structure assembly adapted to be mounted on a ferrous conduit and cooperate therewith to heat thermoplastic material passed through the conduit, comprising an annular metallic spool having a longitudinal passage therethrough, two outwardly directed annular flanges on the spool and in spaced relation longitudinally of the spool, a field coil on and surrounding the spool between the flanges, the spool having a plurality of pairs of transverse openings located beyond the ends of the coil and adjacent to the flanges, magnetic circuit forming means including a plurality of laminated stacks each extending over the coil and having its ends extending through a pair of said openings to the longitudinal passage, and means for securing the stacks in such position to the flanges.

5. A magnetic field structure assembly adapted to be mounted on a ferrous conduit and cooperate therewith to heat thermoplastic material passed through the conduit, comprising an annular metallic spool having a longitudinal passage therethrough and a pair of transverse openings, the openings extending inwardly through the spool to the passage and being in spaced relation longitudinally of the spool, a field coil on and surrounding the spool between the openings, magnetic circuit forming means including a laminated stack having a bridge portion extending over the coil and leg portions at its ends extending inwardly of the spool through said openings to the longitudinal passage, the spool being slotted therethrough longitudinally from one of said openings to the other for interrupting the conductive path through the spool and preventing the formation of eddy currents therein, and means cooperating directly with the laminated stack for the spool and securing the stack in position on the spool.

GRAYDON SMITH.